US011750516B2

United States Patent
Black (10) Patent No.: US 11,750,516 B2
(45) Date of Patent: Sep. 5, 2023

(54) PROGRAMMATICALLY DETERMINING NEXT-HOP MAC ADDRESS

(71) Applicant: Kratos Integral Holdings, LLC, San Diego, CA (US)

(72) Inventor: Gabriel Black, Colorado Springs, CO (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 81 days.

(21) Appl. No.: 17/521,688

(22) Filed: Nov. 8, 2021

(65) Prior Publication Data

US 2022/0150215 A1   May 12, 2022

Related U.S. Application Data

(60) Provisional application No. 63/111,487, filed on Nov. 9, 2020.

(51) Int. Cl.
| G06F 15/16 | (2006.01) |
| H04L 45/74 | (2022.01) |
| H04L 61/50 | (2022.01) |
| H04L 69/16 | (2022.01) |
| H04L 101/622 | (2022.01) |

(52) U.S. Cl.
CPC .............. *H04L 45/74* (2013.01); *H04L 61/50* (2022.05); *H04L 69/16* (2013.01); *H04L 2101/622* (2022.05)

(58) Field of Classification Search
CPC .......... H04L 45/74; H04L 61/50; H04L 69/16
USPC ................................................. 709/203, 245
See application file for complete search history.

(56) References Cited

U.S. PATENT DOCUMENTS

| 7,742,429 B1 * | 6/2010 | Huang ................... H04L 69/162 370/254 |
| 2008/0240154 A1 * | 10/2008 | Oved .................... H04L 69/164 370/466 |

(Continued)

FOREIGN PATENT DOCUMENTS

EP     1657633 B1     5/2006

OTHER PUBLICATIONS

International Search Report and Written Opinion dated Feb. 10, 2022 in PCT/US2021/058468.

*Primary Examiner* — Duyen M Doan
(74) *Attorney, Agent, or Firm* — Procopio, Cory, Hargreaves & Savitch LLP (57) ABSTRACT

Systems, media, and methods are capable of determining a layer 2 destination address that can then be used by a network acceleration application to populate data packets to be transmitted using accelerated networking techniques. The systems and methods provide for a software application executed on a computing device that controls a NIC interface to provide for an accelerated network. The software application resides in the application layer of a networking stack and is interfaced via a virtual NIC or TUN/TAP device with the kernel and the networking stack and operating system (OS) facilities to determine a layer 2 destination address for use in accelerated network applications. Embodiments herein, through the combination above, are able to account for firewall rules, static ARP entries, or any other system-administrator rules put in place for network operations.

20 Claims, 6 Drawing Sheets

(56) References Cited

U.S. PATENT DOCUMENTS

2016/0043950 A1\* 2/2016 Vobbilisetty .......... H04L 45/745
  370/392
2016/0241471 A1\* 8/2016 Wan ........................ H04L 45/74

\* cited by examiner

PROGRAMMATICALLY DETERMINING NEXT-HOP MAC ADDRESS

RELATED APPLICATIONS

This application claims priority to U.S. Provisional Patent Application No. 63/111,487, filed on Nov. 9, 2020, which is hereby incorporated herein by reference as if set forth in full.

FIELD OF THE INVENTION

This application generally relates to routing data packets over a network and to routing such packets in an accelerated manner.

BACKGROUND OF THE INVENTION

In a typical network environment, client devices request and download content stored within network servers. The request is directed to the network servers using routers, gateways, and other network infrastructure devices that direct the requests through the network to the network servers as packets. Upon receiving the content requests, the network servers typically retrieve the requested content, break the requested content into packets, and transmit the packets to the requesting client device. Routers, gateways, and other network infrastructure direct these packets through the network to the client devices, which, in turn, reconstruct the content from the packets and present the content to users via applications residing on the client devices.

The exchange of the data between the various devices may be performed according to a set of communication protocols. Communication protocols are a set of rules that define the syntax, semantics and synchronization of communication between the devices and may be implemented as hardware and/or software. In protocol design, protocols are layered to form a protocol stack, with each layer provided to resolve a class of communication problems. Example protocol stacks include, but are not limited to, networking stacks such as internet protocol suites (e.g., TCP/IP protocol suite), internet model, TCP/IP 5-layer reference model, TCP/IP model, Arpanet reference model, open systems interconnection model (OSI model). Another example networking stack is the networking stack contained in the Linux® operating system which, similar to the OSI model, is a seven layer stack. The Linux® networking stack comprises an application layer (e.g., layer 7), system call interface layer (e.g., layer 6), protocol agnostic interface layer (e.g., layer 5), network protocol layer (e.g., layer 4), device agnostic layer (e.g., layer 3), device drivers layers (e.g., layer 2), and physical hardware layer (e.g., layer 1). The application layer may define a user space and layers 2-6 may be implemented in a kernel.

Figure 1:
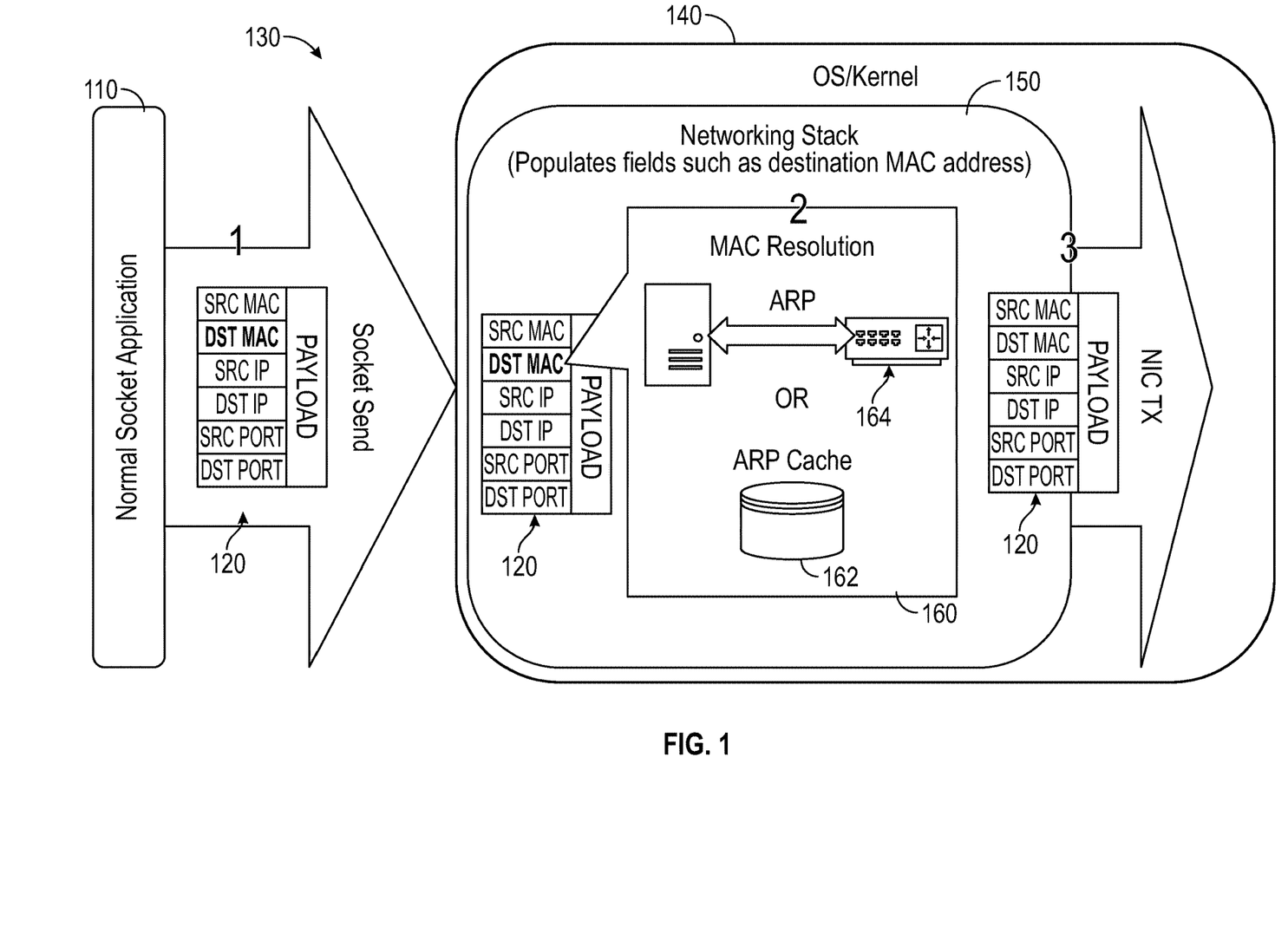
FIG. 1 illustrate a schematic functional flow diagram of a software application for building and sending a datagram packet (UDP) through a networking stack.

FIG. 1 illustrates a schematic example flow that depicts a software application 110 for building and sending a datagram packet (UDP) 120 through (traversing) a networking stack 130. The application may be installed on a computing device (e.g., such as computing device 500 of FIG. 5) and ran under an operating system (e.g., Linux®, Windows®, macOS®, etc.) that contains the kernel 140. The software application 110 may be configured to make a system call (e.g., layer 6 of the networking stack 130) using a socket application programming interface (API) (e.g., layer-5). The application 110 may also provide information to layer 7 and information required in layers 3 and 4 (e.g., destination internet protocol (TP) and destination UDP port). The networking stack 130 in conjunction with the kernel 140 may be implemented to provide the remaining information to populate layers 2-4.

At step 1, the application 110, residing at the application layer, creates a socket to send the UDP 120. For example, the application 110 generates a payload comprising a request for data and populates protocol headers with a destination (DST) IP address and DST port (shown in green). The remaining protocol headers are typically populated by the kernel 140 via the one or more layers of the networking stack therein 150. The application makes a request via the socket API to the kernel 140 through, for example, a system call interface layer. The remaining layers of the networking stack are configured to resolve the protocol headers based on routing rules (e.g., network-rules, security, or firewall measures) and populate the protocol headers with the source (SRC) MAC address, SRC IP address, SRC port (as shown in green in step 2). However, the DST MAC address (e.g., a layer 2 destination address) is determined by layer 2 of the networking stack (e.g., the device drivers layer) through a resolution procedure protocol. The resolution procedure 160 may be implemented based on request for comments (RFC) standards, for example, RFC 6747, RFC 826, RFC 6575, etc. An example resolution procedure 160 may include accessing an address resolution protocol (ARP) database 162 (e.g., a cache or other temporary data storage medium) that stores layer 2 destinations address according to the DST IP address based on networking rules. For example, the ARP database 162 stores DST MAC address for a next-hop destination device (e.g., a switch element, router, gateway, etc.) that will be used for directing the data packet to the DST IP address. Defining the next-hop MAC address may be based on a predetermined set of rules that accounts for routing rules such as network-rules, security measures, and/or firewall measures. These rules may be predefined by the Network/System Administrator. If a DST MAC address is located in the ARP database for the DST IP address, then layer 2 of the networking stack populates the layer 2 protocol header with the resolved DST destination address (e.g., the DST MAC address). Otherwise, the layer 2 executes an ARP resolution exchange 164 that comprises sending an ARP request packet based on the DST IP address and networking-administrator rules that may be in place. The destination device responds to the ARP request with an ARP response packet including the DST destination address. The layer 2 then populates the layer 2 protocol header with the DST destination address, as well as saving the DST destination address to the ARP database for use in subsequent procedures. At step 3, the UDP 120 is complete with each protocol header populated (as shown in green) and the UDP 120 is provided to the network interface controller (NIC) for transmission (sometimes referred to herein as NIC or NIC TX) over the network by the physical layer.

The network may experience a variety of issues that impact data exchange rates (e.g., upload and/or download speeds) to the network. These issues include large volume content requests that take time to populate each protocol header or otherwise diminish data upload rates and/or download rates. To increase transmission speeds and reduce latency, network acceleration techniques may be employed by devices throughout the network (e.g., client devices, network servers, and/or intermediate network devices such as routers and gateways located between the client devices and the servers). These network acceleration techniques may be implemented as software and/or hardware and are used to increase the speed of data flow between client devices and network servers. These techniques can address the above listed issues or other issues that adversely affect data exchange speeds.

An example network acceleration technique is to provide a software application installed on the client device and configured to bypass the networking stack. The application may be configured to populate the protocol headers at the application layer and therefor directly manage the packet flows into the network. That is, instructions in the application may be executed to programmatically populate one or more protocol headers. Example network acceleration applications include Data Plane Development Kit (DPDK), PFRING_ZC, and NETMAP.

Figure 2:
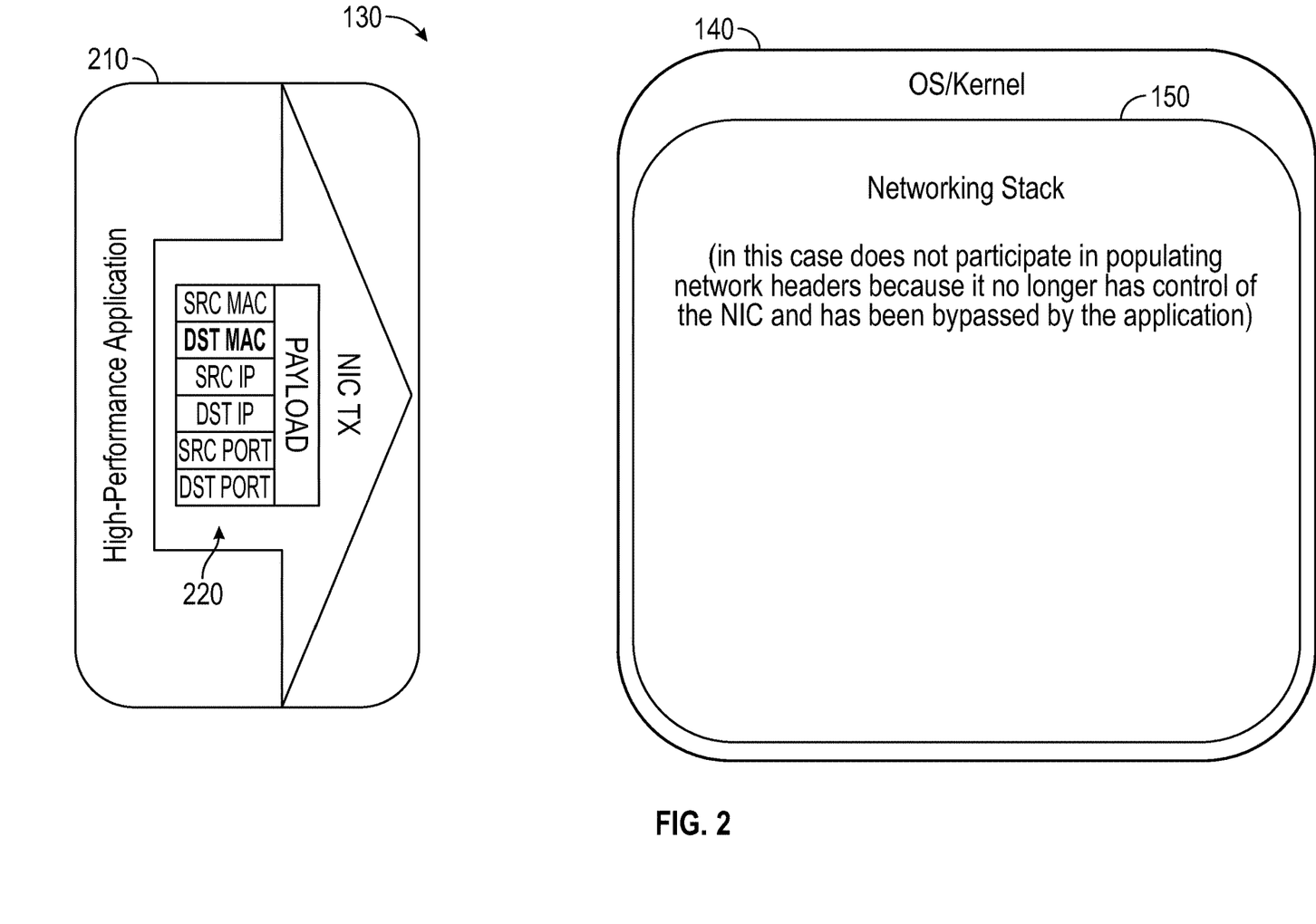
FIG. 2 illustrate a schematic functional flow diagram of a network acceleration application.

FIG. 2 illustrates a schematic flow diagram of a network acceleration application. Similar to FIG. 1, FIG. 2 illustrates an application 210 and networking stack 130 contained in an operating system. The networking stack 130 maybe identical or substantively similar to the networking stack 130 of FIG. 1. However, the application 210 residing at the application layer is configured to directly control the NIC, as opposed to being controlled by the kernel 140 as described above in FIG. 1. This modification permits that application 210 to bypass the networking stack 130 and directly send packets over the network at accelerated rates.

As a result of bypassing the networking stack 130 (also referred to as "kernel bypass"), the application 210 is required to populate the protocol headers of each packet (e.g., UDP 220) for transmission over the network. However, a challenge arises, because in order to participate in a layer 2/3 switched network, there are many networking protocols, request for comments (RFCs), and standards that the application is required to implement in order to properly populate the layer 2 and 3 protocol headers. One example approach is through the use of DPDK that provides libraries to accelerate packet processing, which facilitates populating the SRC MAC address, SRS IP address, and SRC port (as shown in orange in FIG. 1 and in green in FIG. 2). One example approach that DPDK takes is through the use of a virtual network interface controller (VNIC) in order to provide an interface within the kernel to the NIC that is currently controlled by the application. DPDK provides the VNIC concept (KNI) in order to enable a network interface that is integrated in a networking stack, such as Linux®. Thus, by implementing a VNIC, an interface for the kernel is provided to send packets to the physical/actual NIC controlled by the application. Accordingly, the application 210 is able to participate in network functions (e.g., ARP resolution, DNS, PING/ICMP, etc.). These network functions are procedures that nodes participating in a network should perform. For example, if a server gets a "ping" packet (a type of ICMP), then it should respond with a certain type of packet with predetermined and expected contents. ARP resolution is another example of a network function/procedure. These procedures for these different types of functions are defined in various RFCs, but are also affected by system administrator policies (for example, a system administrator can enable policy that restricts the server from responding to ICMP (ping packets)). Further examples of virtual NICs include, but are not limited to, TUN/TAP virtual NICs. Embodiments herein are not limited to the enumerated NIC, but encompass any NIC (virtual or not) capable of being controlled directly by the application 210, thereby bypassing the other layers of the networking stack 130.

However, there is no way to programmatically determine via software implementations the destination MAC address, as that is done in switched and routed networks, without re-implementing the networking stack functions for each packet (and thus re-invent the wheel each time). Thus, for fast-path (e.g., network path bypass), the application 210, even when utilizing the above VNIC that provides the interface of the kernel as outlined above, is not able to determine the layer 2 destination MAC address (e.g., next-hop MAC address) without facilities of the network functions executed by the operating system.

For example, in Linux®, the networking stack does not have any APIs to programmatically query what the layer 2 destination address should be. Thus, the application 210 cannot query for this address, and instead must proceed through the networking stack as outlined in FIG. 1. In other words, there isn't a way to integrate the KNI/virtual interface and the networking-stack bypass through any sort of networking stack API call. Thus, in Linux®, the only way to solicit an ARP request is to create a socket and request an IP packet be transmitted according to the process described above in connection to FIG. 1. This will cause a ARP resolution 160 (FIG. 1) to occur (if required).

Even if such an API does exist in an operating system (as it does in Windows®), the API does not address whether an ARP should be solicited, as there could be various network-rules, security, or firewall measures that may have been put in place by a Network/System Administrator that would result in a differing response. Thus, if the application decides to "hard-code" or in some manner pre-populate the destination MAC address, it effectively bypasses any security or firewall measures that may have been put in place by a Network/System Administrator (with which the networking stack enforces based on networking rules).

SUMMARY OF THE INVENTION

The following summary is not intended to define every aspect of the invention, and other features and advantages of the present disclosure will become apparent from the following detailed description, including the drawings. The present disclosure is intended to be related as a unified document, and it should be understood that all combinations of features described herein are contemplated, even if the combination of features are not found together in the same sentence, paragraph, or section of this disclosure. In addition, the disclosure includes, as an additional aspect, all embodiments of the invention narrower in scope in any way than the variations specifically mentioned herein.

Accordingly, embodiments disclosed herein address these issues by providing systems, media, and methods capable of determining a layer 2 destination address that can then be used by a network acceleration application to populate data packets to be transmitted using accelerated networking techniques. Various embodiments described herein provide for a software application executed on a computing device that controls a NIC interface to provide for an accelerated network. The software application resides in the application layer of a networking stack and is interfaced via a virtual NIC or TUN/TAP device with the kernel and the networking stack and operating system (OS) facilities to determine a layer 2 destination address for use in accelerated network applications. Embodiments herein, through the combination above, are able to account for firewall rules, static ARP entries, or any other system-administrator rules put in place for network operations. For example, a virtual NIC interface (such as the KNI in DPDK, TUN/TAP virtual NIC, a post-routing rule such as those provided by iptables or netfilter, etc.) controlled by a software application interfaced via a virtual NIC or TUN/TAP device with a kernel and the networking stack and OS facilities to determine a next-hop MAC address, store the resolved MAC address in a database, and use the stored MAC address to populate the layer 2 header of data packets for accelerated transmission of subsequent packets.

Embodiments include methods to accelerate the transmission of packets by programmatically determining at least one next-hop mac address for packets to be transmitted in a network by an application residing at the application layer in a system having a kernel having a protocol stack. Such methods create a phantom datagram (UDP) having protocol headers; populate one or more of the protocol headers of the phantom UDP while leaving the next-hop MAC address header unpopulated; submit the phantom UDP to the kernel for traversing the protocol stack; receive the phantom UDP from the kernel with the next-hop MAC address header having been populated by the kernel; recognize the phantom UDP based upon one or more predetermined characteristics; store the next-hop MAC address header from the phantom UDP; and do not transmit the phantom UDP.

Such methods can also create a next UDP; retrieve the stored next-hop MAC address; and populate the header of the next UDP with the retrieved next-hop MAC address.

In addition, wherein the protocol stack of the kernel determines the next-hop MAC address header based on a predetermined set of rules that accounts for routing rules and wherein the predetermined set of rules accounts for one or more of network-rules, security measures, firewall measures.

In addition, wherein the application has control over a NIC, such methods can further instruct the NIC to drop the phantom UDP. Such methods can further bypass the kernel and provide a next UDP to the NIC with the stored the next-hop MAC address header populated in the next UDP.

In addition, such methods can use a bind call and a connect call with the kernel to create a socket; retrieve and store the source IP and source destination from the phantom UDP which where populated by the kernel; and populate the header of the next UDP with the stored source IP source destination.

Embodiments also include methods to programmatically determining at least one layer 2 destination address for packets to be transmitted in a network by an application residing at the application layer in a system having a kernel. Such methods operate by creating a phantom packet; populating one or more of the protocol headers of the phantom packet while leaving the layer 2 destination address unpopulated; submitting the phantom packet to the kernel; receiving the phantom packet from the kernel with the layer 2 destination address header having been populated by the kernel; recognizing the phantom packet; storing the layer 2 destination address from the phantom packet; creating a next packet; and populating the header of the next packet with the stored layer 2 destination address.

Embodiments further include systems for accelerated transmission of packets over a network by programmatically determining a layer 2 destination address. Such systems comprise at least one processor; and a memory in communication with the at least one processor and storing instructions that when executed by the at least one processor cause the at least on one processor to perform one of more of the methods described above.

BRIEF DESCRIPTION OF THE DRAWINGS

The details of embodiments of the present disclosure, both as to their structure and operation, can be gleaned in part by study of the accompanying drawings, in which like reference numerals refer to like parts and or functions, and in which.

DETAILED DESCRIPTION OF THE INVENTION

Figure 3A:
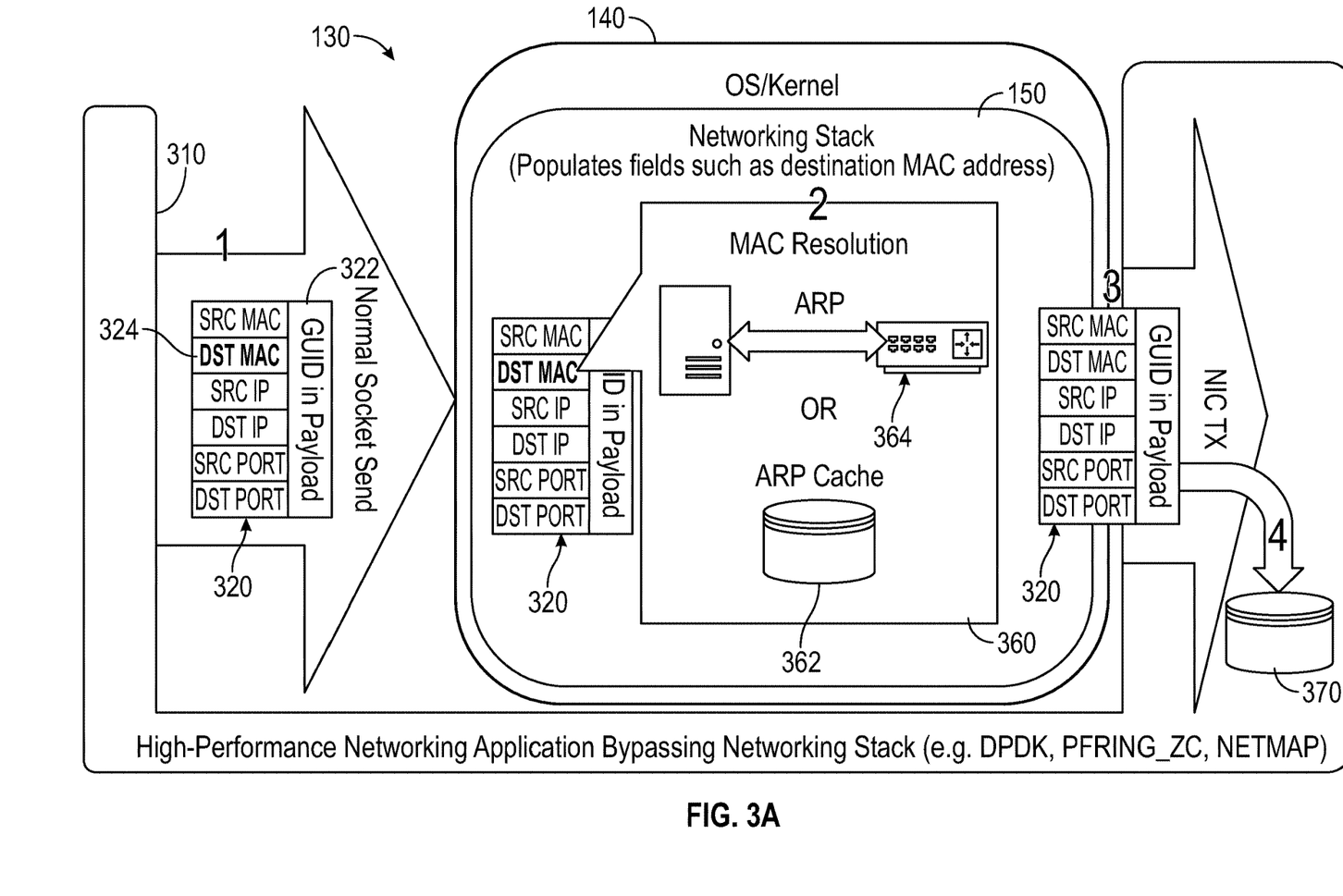
FIGS. 3A and 3B illustrate a schematic functional flow diagram of a network acceleration application.
Figure 3B:
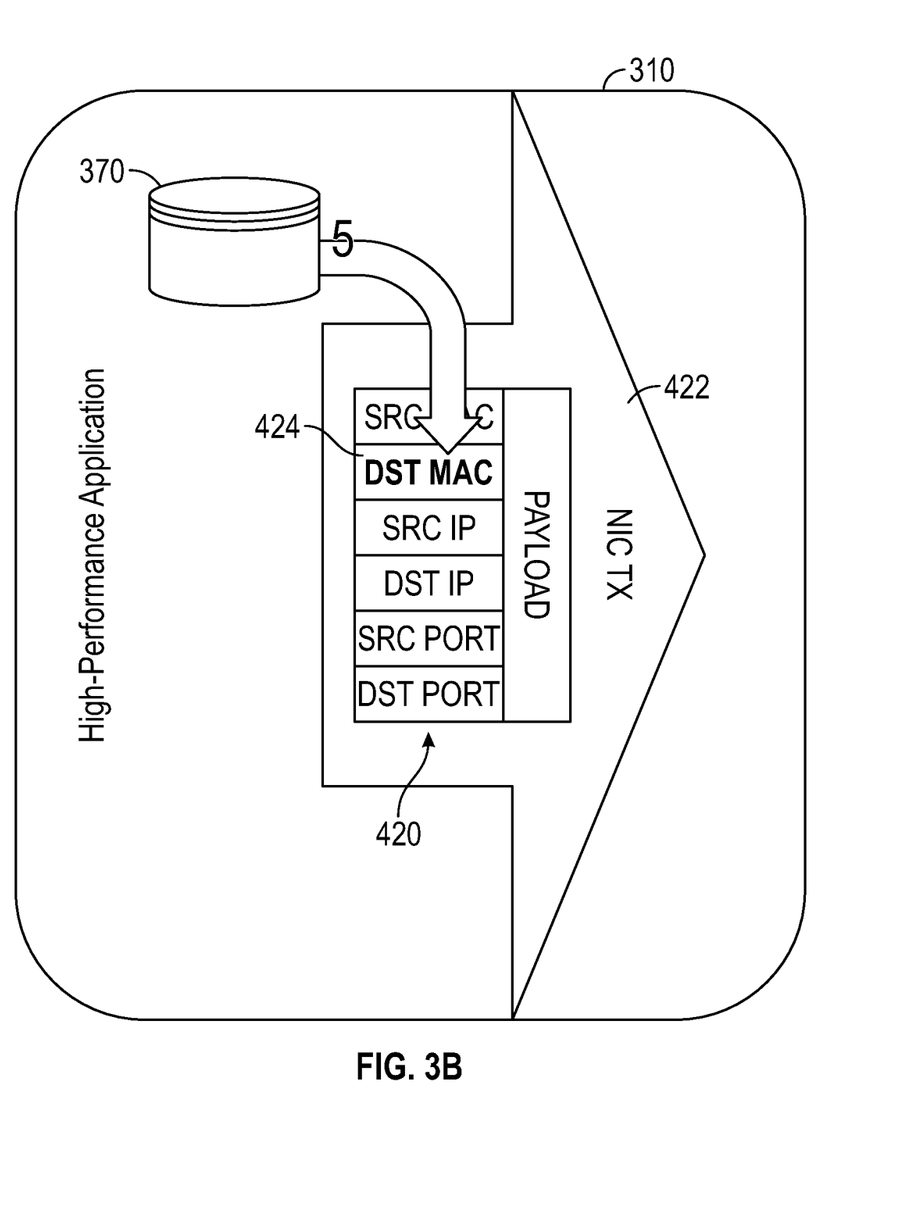

FIGS. 3A and 3B illustrate a schematic functional flow diagram of a network acceleration application 310 that is configured to determine a layer 2 DST address in accordance with the embodiments disclosed herein. Similar to FIG. 2, FIG. 3 illustrates an application 310 and networking stack 130 contained in an operating system. The networking stack 130 may be substantively similar to the networking stack 130 of FIG. 1. The application 310 may be similar to the application 210 of FIG. 2, in that application 310 resides at the application layer of the networking stack 130 and is configured to directly control the NIC for accelerated data packet exchange (the NIC is illustratively shown within the application 310). Thus, as with application 210, application 310 is able to bypass the kernel 140 and the layers of the networking stack implemented thereby for direct transmission of data packets.

The application 310 is also configured to determine a layer 2 DST address for use in the accelerated transmission of packets. For example, the application 310 is configured to leverage the kernel 140 and the networking stack 130 to determine the layer 2 DST address and store the layer 2 DST address in the ARP database 362 (e.g., an ARP cache or other temporary data storage medium). Then, the layer 2 DST address can be programmatically retrieved by the application 310 and used to programmatically populate the layer 2 header of an accelerated UDP 420 (as shown in FIG. 3B). The UDP 420 may be substantively similar to the UDP 220 of FIG. 2, in that both UDPs are accelerated packets that are directly controlled and transmitted by the respective application.

For example, at step 1 (indicated by the large number 1), the application 310 is configured to and does create a phantom packet such as a phantom UDP 320. In one embodiment the payload of the phantom UDP 320 is populated with a unique identifier (UID). The UID may be any globally unique identifier (GUID) that can uniquely identify the phantom UDP 320. For example, in some embodiments, the UID may be a 64 bit pseudo-random value. However, the UID may be any bit length and may be a pseudo-random, random, or non-random as desired by the operator. Alternatively, other ways for the application 310 to identify the phantom UDP 320 can be used. For example, if the application 310 is only sending accelerated packets, any UDP from the kernel must be a phantom UDP. A further example, is to set the Source IP in the header of the phantom UDP to a predefined address. More generally, any criteria or set of criteria that is known to the application 310 as indicating a phantom UDP 320 can be used.

The phantom UDP 320 can be used to resolve the layer 2 DST address, prior to creating accelerated UDPs for transmission over the network (e.g., UDP 220 and/or UDP 420). The application 310 may populate one or more of the protocol headers as described above in connection to FIG. 2. Alternatively, one or more protocol headers of the phantom UDP 320 are left un-populated. Particularly, since the layer 2 header 324 cannot be programmatically determined, header 324 is not populated. FIG. 3A illustrates that the application 310 has populated all headers except for the header 324 (DST MAC shown in bold). Once the phantom UDP 320 is created, it is socketed and submitted to the kernel 140, as described above in connection with FIG. 1.

At step 2 (indicated by the large number 2), any protocol headers that were not populated by the application 310 at the application layer are resolved and populated by the kernel 140, for example, as described above in connection with FIG. 1. Specifically, since the layer 2 header 324 is not populated, the layers 150 in the kernel (e.g., the device drivers layer or layer 2 of the networking stack 130) resolve the layer 2 DST address. For example, the layer 2 of the networking stack 130 performs a resolution process 360, which may be identical or substantially similar to the resolution process 160 described above. Because the phantom UDP 320 traverses the networking stack 130, any security measures, firewall measures, and/or routing rules are applied to the information populated by the networking stack. Thus, the phantom UDP 320 accounts for such measures and does not circumvent the security protocols that are in place.

For example, the resolution procedure 360 may include accessing an address resolution protocol (ARP) database 362 (e.g., a cache or other temporary data storage medium) that stores layer 2 destinations address according to the DST IP address according the networking rules. For example, the ARP database 362 stores DST MAC address for a next-hop destination device (e.g., a switch element, router, gateway, etc.) that will be used for directing the data packet to the DST IP address. The next-hop MAC address may be based on a predetermined set of rules that accounts for routing rules such as network-rules, security measures, and/or firewall measures. These rules may be predefined by the Network/System Administrator. If a DST MAC address is located in the APP database 362 for the DST IP address populated in the phantom UDP 320, then the networking stack 130 populates the layer 2 protocol header with the resolved DST MAC address. Otherwise, an ARP resolution exchange 364 (which may be similar to the exchange 164) is performed. As with exchange 164, the ARP resolution exchange 364 comprises the layer 2 of the networking stack sending an ARP request packet based on the DST IP address and networking-administrator rules that may be in place. The destination device responds to the ARP request with an ARP response packet including the DST MAC address for the next-hop destination device. At step 3, the networking stack (e.g., the device drivers layer or layer 2) populates the layer 2 protocol header 324 with the DST MAC address.

At step 3 (indicated by the large number 3), the phantom UDP 320 is provided to the virtual NIC (e.g., NIC TX). The application 310, having control of the virtual NIC, is configured to recognize the UID in payload 322 and identify the packet as a phantom UDP based on recognizing the UID. The application 310 may comprise a set of rules that that are applied to the payload to recognize the UID, and thus identify the UDP as a phantom UDP. Once the phantom UDP 320 is identified, the application 310 extracts any relevant protocol header information, for example, any information that the application was unable to prepopulate at step 1 and stores the extracted information in a data storage device 370. For example, at step 4 (indicated by the large number 4), the application 310 extracts the layer 2 DST address from the layer 2 header 324 of the phantom UDP 320 and stores the layer 2 DST address in the data storage device 370. In some embodiments, the data storage device 370 is a cache memory or other temporary storage media.

Also, at step 4, the virtual NIC and/or actual NIC (generally referred to a NIC) under the control of the application 310) determines whether to submit a given UDP to the physical layer for transmission or not. For example, the application 310 identifies the packet as the phantom UDP 320 based on the UID in the payload and the virtual NIC determines that the phantom UDP 320 is not to be transmitted over the network and it is dropped.

Once the information is stored in data storage device 370, the information can be used to programmatically populate the protocol headers of UDPs for accelerated transmission. For example, as shown in FIG. 3B, the application 310 creates an accelerated UDP 420 and populates each protocol header, including the layer 2 header, by retrieving relevant information from data storage device 370. The UDP 420 and application 310 at step 5 (indicated by the large number 5) may be similar to the UDP 220 and application 210 of FIG. 2, except that the layer 2 header is also populated by application 310. The application 310 is able to fully bypass the kernel 140 and the layers of the networking stack 130 implemented thereby to continuously transmit packets at high data rates.

A non-limiting advantage of the embodiments described herein is that the application 310 is able to determine a next-hop MAC address by making use of any firewall rules/measures, IP-tables function, ARP-resolution procedures, or any other configurations set up by the Network/System Administrator without unnecessarily transmitting data packets on the network. Unnecessary packets would reduce data exchange rates/speeds as each packet, necessary or not, requires network resources for transmission. In other words, embodiments herein are able to overcome the lack of an API existing in the OS to determine the next-hop MAC address. Similarly, even if an API exists, the embodiments herein are able to still account for security measures implemented by the Network/System Administrator.

A networking stack (kernel) bypass, such as described above (e.g., one using dpdk) that resides along other applications that use the kernel networking stack needs to ensure that connections that are established by the kernel bypass solution don't interfere with "normal" networking stack connections. One of the potential contention areas are the layer-4 ports used in socket connections such as UDP and TCP socket. The following example embodiment describes how networking stacks (such as BSD and Linux) reserve ports used in both server and client connections and how this could clash with a kernel bypass solution. In this example the method used to "reserve" a port used in socket communication is by calling bind( ).

When a connection is made the operating system needs to select an unused source port number. Linux, for example, selects a port from an ephemeral port range, which by default is a set to range from 32768 to 61000 (~28K ports to choose from). In Linux the ephemeral port range is a global resource. In reality, the port number is 16-bits long, so one could extend the port range to ~64K possible selections.

With multiple destination addresses it is possible to have nearly an unlimited number of connections. However, establishing more than 64K concurrent connections (28K with the default ephemeral port range) to a single (destination IP, destination port) pair will fail.

It is possible to ask the kernel to select a specific source IP and port by calling bind( ) before calling connect( ), for example:

```
s = socket.socket(socket.AF_INET, socket.SOCK_STREAM)#
Let the source address be 192.168.1.21:1234
s.bind(("192.168.1.21", 1234))
s.connect((www.google.com, 80))
```

This approach is often called, "bind before connect". Specifying port number 0 means that the kernel should do a port allocation for the requesting application, for example:

```
s = socket.socket(socket.AF_INET, socket.SOCK_STREAM)
s.bind(("192.168.1.21", 0))
s.connect((www.google.com, 80))
```

This method is fairly well known, but there is a catch. Bind is usually called for listening sockets so the kernel needs to make sure that the source address is not shared with anyone else. That is a problem. When using this technique in this form it is impossible to establish more than 64 k (ephemeral port range) outgoing connections in total. After that the attempt to call bind( ) will fail with an EADDRINUSE error—all the source ports will be busy.

To overcome this catch, the application can use the SO_REUSEADDR setting. By setting SO_REUSEADDR, application informs the kernel of an intention to share the bound port with anyone else, but only if the sharing doesn't cause a conflict on the protocol layer.

Below is a usage example:

```
s = socket.socket(socket.AF_INET, socket.SOCK_STREAM)
s.setsockopt(socket.SOL_SOCKET, socket.SO_REUSEADDR, 1)
s.bind(("192.168.1.21", 0))
s.connect((www.google.com, 80))
```

In this example the kernel will find a port that doesn't directly conflict with other sockets but, as opposed to the lack of SO_REUSEADDR setting, ports in TIME_WAIT and used by already established connections may be reused. Therefore, by setting the SO_REUSEADDR flag, it is possible to have more than 64 k (ephemeral port range) outgoing connections from a single selected IP to multiple destinations.

But there is another catch: when an application calls bind( ), the kernel knows only the source address the application is asking for. The application will inform the kernel of a destination address only when it calls connect( ) later. This may lead to problems as the kernel may reuse source ports already used by another connection possibly to the same destination the application wants to use. In such case connect( ) will fail with EADDRNOTAVAIL error.

If an application wants to establish more than 64 k (ephemeral port range) connections to a single destination, you need to use all the foregoing approaches:
Tweak kernel parameters to increase ephemeral port range.
Manually specify many source IP addresses by using bind before connect.
Set SO_REUSEADDR flag on outgoing connections.
Check bind( ) for EADDRINUSE errors, in case the kernel runs out of available ports.
Check connect( ) for EADDRNOTAVAIL errors in case there is a connection conflict and retry if necessary.

Unfortunately, connections established with normal connect( ), and with bind-before-connect don't mix well. Outgoing ports used by one technique can't be reused by another. If you establish 64 k connections using connect( ), bind( ) will fail with EADDRINUSE. And the other way around: when thousands of connections are using bind before connect straight connect might fail with EADDRNOTAVAIL.

In a system where other applications do not use bind-before-connect, the foregoing bind-before-connect approach to reserve an ephemeral port can run into conflicts with such applications. Therefore, application 310 uses the networking stack to create a socket using the normal bind/connect calls that one would make for a socket connection and sends a phantom UDP through the kernel 140 and the layers of the networking stack 150 similar to how that was described above. The application stores the source port, and, if desired, the source IP, from the header of the phantom UDP and uses them for subsequent kernel-bypass packets. A single phantom UDP 320 can be used for both obtaining the DST MAC address and the source port (and, if desired, the source IP) or separate phantom UDPs can be used.

The application recognizes that phantom UDP when it is returned to the NIC using the techniques described above. The NIC drops the phantom UDP and does not transmit it. Additionally, the application 310 needs to keep the networking socket open for the duration of the kernel-bypass packet transmissions in order to keep the port allocations "reserved", e.g., the application does not close the socket until the duration of the kernel bypass packet transmission is over.

While embodiments herein are described with reference to a networking stack contained in Linux® OS, it will be appreciated that the embodiments are not limited to Linux® networking stacks, but may be equally applicable to networking stacks contained in other operating systems (e.g., macOS®, Windows®, etc.). Furthermore, the embodiments herein are also not limited to the seven layer protocol stack described herein, but are equally application to other protocol stacks, such as internet protocol suites (e.g., TCP/IP protocol suite), internet model, TCP/IP 5-layer reference model, TCP/IP model, Arpanet reference model, open systems interconnection model (OSI model), etc.

Figure 4:
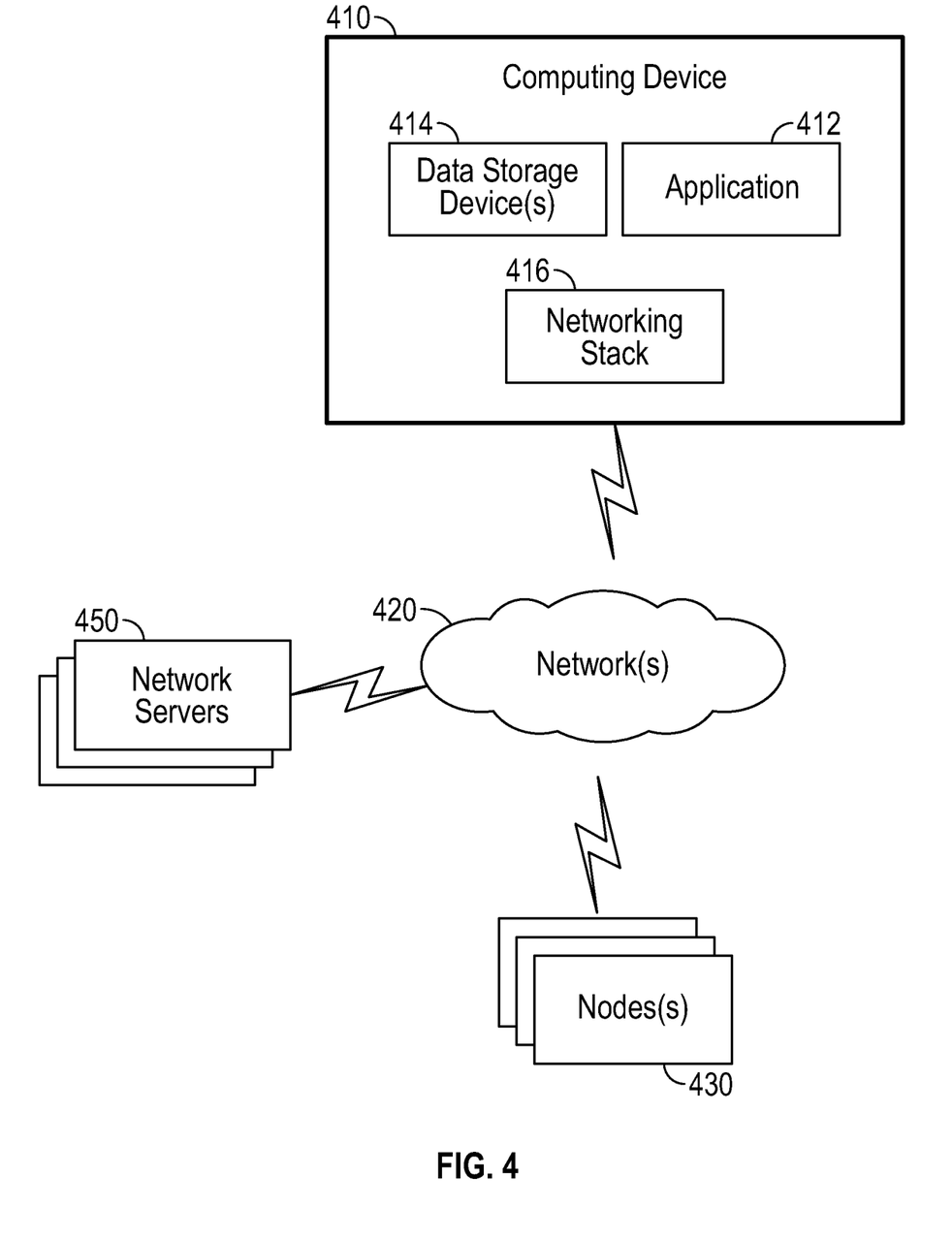
FIG. 4 is a functional block diagram of an infrastructure in which embodiments of disclosed systems, methods, and media may operate, according to embodiments disclosed herein.

FIG. 4 illustrates as functional blocks an infrastructure in which embodiments of disclosed systems, methods, and media may operate, according to embodiments disclosed herein. The infrastructure may include a client computing device 410 comprising an application(s) 412 (for example application 310), data storage device(s) 414, and a networking stack 416. The computing device 410 may be communicatively connected to one or more network nodes 430 for directing data packets from the computing device 410 to network server(s) 450 and/or one or more network server(s) 450 via one or more network(s) 420.

Computing device(s) 410 and network server 450 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks. Similarly, node(s) 430 may comprise any type or types of computing devices capable of wired and/or wireless communication. The node(s) 430 may be implemented as any hardware device that acts as a gate between networks to form a link for data to flow from one computing device to another, for example, by routing or directing data packets form a packet source device (e.g., computing device 410) to a destination device (e.g., network server 450), and vice versa. The node(s) 430 may be implemented as a router, firewall, server, hub, gateway or any device that enables traffic to flow in and out of the network. In addition, each node 430 may be communicatively connected with one or more devices and/or other nodes 430. It should be understood that the infrastructure may comprise any number of gateway(s), device(s), user system(s), platform(s), sets of server(s), and database(s). An example wired or wireless system that maybe implemented as computing device 410 and network server 450 is illustrated as wired or wireless system 500 of FIG. 5.

The application(s) 412 and networking stack 416 may be stored as instructions in the data storage device(s) 414 and are executed by the computing device 410 to perform functions thereon. As described above, the networking stack 416 comprises a kernel contained in an operating system executed by the computing device 410. The networking stack 416 may be similar to the networking stack 430 described above in connection to FIGS. 1-3B, or any other type of communication protocol stack. The application(s) 412 may be one or more of application 410, application 210, and/or application 310. For example, application 310 may be installed on computing device 410 as one of application(s) 414 and executed to for accelerated networking applications for high data rate transmissions as described in connection with FIGS. 3A and 3B. Thus, computing device 410 is able to transmit data packets to the network server(s) 450 as described herein in connection to FIGS. 3A and 3B.

Network(s) 420 may comprise the Internet, and server(s) 450 may communicate with nodes 430 and computing device 410 through the Internet using standard transmission protocols, such as HyperText TFTPS), SSH FTP (SFTP), and the like, as well as proprietary protocols. While platform 410 is illustrated as being connected to various systems through a single set of network(s) 420, it should be understood that platform 410 may be connected to the various systems via different sets of one or more networks.

Network sever(s) 450 may comprise web servers that host one or more websites, web services, and/or web content. In embodiments in which a website is provided, the website may comprise one or more user interfaces, including, for example, webpages generated in HyperText Markup Language (HTML) or other language (e.g., a graphical-based and/or text-based language). Network sever(s) 450 transmit or serve these user interfaces in response to requests from computing device 410. The requests to network sever(s) 450 for data and the responses may both be communicated through network(s) 420, which may include the Internet, using standard communication protocols (e.g., HTTP, HTTPS). The responses and requests may be received and routed by communication nodes 430 to the network server 450 according to routing rules. The routing rules, for example, may be referenced in populating protocol headers of a data packet as described above.

The computing device 410 may request content and data from the network server(s) 450. The request may be transmitted in the form of a data packet and is directed to the network server(s) 450 using node(s) 430 that direct the requests as packets through the network 420. Upon receiving the request packets, the network server(s) typically retrieve the requested content, break the requested content into packets, and transmit the packets to the requesting client device 410. Node(s) 430 direct these packets through the network to the client device 410.

Example platforms that may include the components illustrated in FIG. 4, include but are not limited to, Channelizer®, Combiner®, quantumRadio®, quantumRX Wideband Software Receiver®, DataDefender®, similar products offered by Kratos Defense & Security Solutions, Inc. Such products may be implemented to achieve high data rates and small packet size transfers by leveraging the embodiments discloses herein. For example, the systems herein may be able to achieve packet transmission rates of 3 Gbps or more using a maximum transmission unit (MTU) for each packet may be 1500 bytes. However, it should be understood that other platforms from other manufacturers may also utilize the embodiments herein to achieve accelerated data transmission rates with small packet sizes.

Figure 5:
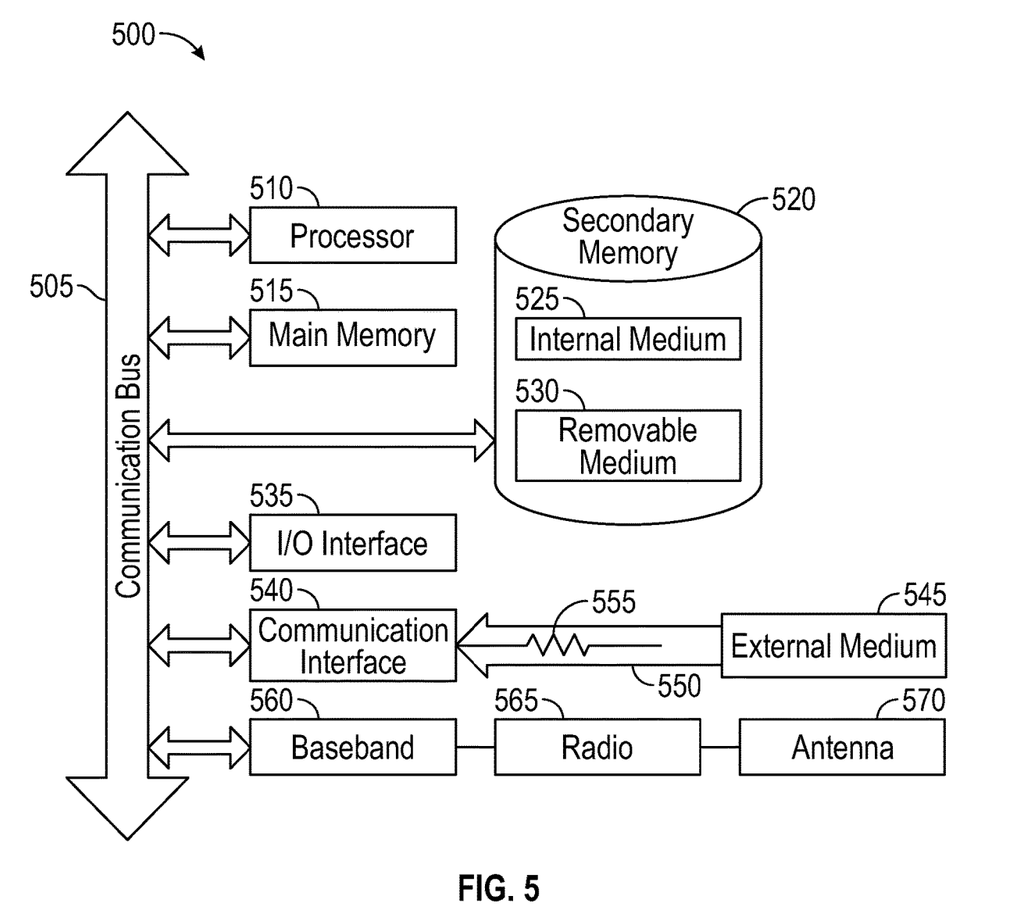
FIG. 5 is a functional block diagram illustrating an example wired or wireless processing system that may be used in connection with various embodiments described herein.

FIG. 5 is a functional block diagram illustrating an example wired or wireless processing system 500 that may be used in connection with various embodiments described herein. For example, the system 500 may be used as or in conjunction with one or more of the mechanisms, processes, methods, or functions (e.g., to store and/or execute one or more software modules) described above, and may represent components of computing device 410, server(s) 450, communication node(s) 430, and/or other devices described herein. The system 500 can be a server or any conventional personal computer, or any other processor-enabled device that is capable of wired or wireless data communication. Other computer systems and/or architectures may be also used, as will be clear to those skilled in the art. In addition, it should be understood that while system 500 is illustrated with certain elements, it may comprise fewer or more elements than those illustrated, depending on the particular component it represents. For example, a system 500 without wireless communication capabilities may not include baseband 560, radio 565, and antenna 570.

The system 500 preferably includes one or more processors, such as processor 510. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 510. Examples of processors which may be used with system 500 include, without limitation, the Pentium® processor, Core i7@processor, Xeon® processor, and other models available from Intel Corporation of Santa Clara, Calif., as well as hardware processors from other manufacturers, such as Advanced Micro Devices of Sunnyvale, Calif.

The processor 510 is preferably connected to a communication bus 505. The communication bus 505 may include a data channel for facilitating information transfer between storage and other peripheral components of the system 500. In addition, the communication bus 505 may provide a set of signals used for communication with the processor 510, including a data bus, address bus, and control bus (not shown). The communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 500 preferably includes a main memory 515 and may also include a secondary memory 520. The main memory 515 is a non-transitory computer-readable medium which provides storage of instructions and data for programs executing on the processor 510, such as one or more of the functions and/or modules discussed above and illustrated in at least FIGS. 1-3B. It should be understood that programs stored in the memory and executed by processor 510 may be written and/or compiled according to any suitable language, including without limitation C/C++, Java, JavaScript, Perl, Visual Basic, .NET, proprietary visual scripting languages, proprietary scripting languages, and the like. The main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 520 may optionally include an internal memory 525 and/or a removable medium 530, for example a floppy disk drive, a magnetic tape drive, a compact disc (CD) drive, a digital versatile disc (DVD) drive, other optical drive, a flash memory drive, microSD, etc. The removable medium 530 is read from and/or written to in a well-known manner. Removable storage medium 530 may be, for example, a floppy disk, magnetic tape, CD, DVD, SD card, thumb drive, etc.

The removable storage medium 530 is a non-transitory computer-readable medium having stored thereon computer executable code (i.e., software) and/or data. The computer software or data stored on the removable storage medium 530 is read into the system 500 for execution by the processor 510.

In alternative embodiments, secondary memory 520 may include other similar means for enabling computer programs or other data or instructions to be loaded into the system 500. Such means may include, for example, an external storage medium 595 and an interface 540. Examples of external storage medium 595 may include an external hard disk drive, an external optical drive, or an external magneto-optical drive.

Other examples of secondary memory 520 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 530 and communication interface 540, which allow software and data to be transferred from an external medium 560 to the system 500.

System 500 may include a communication interface 540. The communication interface 540 allows software and data to be transferred between system 500 and external devices (e.g. printers), networks, or information sources. For example, computer software or executable code may be transferred to system 500 from a network or cloud server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 500 with a network or another computing device.

Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode, integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 540 are generally in the form of electrical communication signals 555. These signals 555 are preferably provided to communication interface 540 via a communication channel 550. In one embodiment, the communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 515 and/or the secondary memory 520. Computer programs can also be received via communication interface 540 and stored in the main memory 515 and/or the secondary memory 520. Such computer programs, when executed, enable the system 500 to perform the various functions of the present invention as previously described.

In this description, the terms "computer-readable medium," "storage medium," and "medium" are used to refer to any non-transitory computer readable storage media used to provide computer executable code (e.g., software and computer programs) to the system 500. Examples of these media include main memory 515, secondary memory 520 (including internal memory 525, removable medium 530, and external storage medium 595), and any peripheral device communicatively coupled with communication interface 540 (including a network information server or other network device). These non-transitory computer readable mediums are means for providing executable code, programming instructions, and software to the system 500.

In an embodiment that is implemented using software, the software may be stored on a computer-readable medium and loaded into the system 500 by way of removable medium 530, I/O interface 535, or communication interface 540. In such an embodiment, the software is loaded into the system 500 in the form of electrical communication signals 555. The software, when executed by the processor 510, preferably causes the processor 510 to perform the inventive features and functions previously described herein.

In an embodiment, I/O interface 535 provides an interface between one or more components of system 500 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 500 also includes optional wireless communication components that facilitate wireless communication over a voice and over a data network. The wireless communication components comprise an antenna system 570, a radio system 565 and a baseband system 560. In the system 500, radio frequency (RF) signals are transmitted and received over the air by the antenna system 570 under the management of the radio system 565.

In one embodiment, the antenna system 570 may comprise one or more antennae and one or more multiplexors (not shown) that perform a switching function to provide the antenna system 570 with transmit and receive signal paths. In the receive path, received RF signals can be coupled from a multiplexor to a low noise amplifier (not shown) that amplifies the received RF signal and sends the amplified signal to the radio system 565.

In alternative embodiments, the radio system 565 may comprise one or more radios that are configured to communicate over various frequencies and protocols. In one embodiment, the radio system 565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 565 to the baseband system 560.

If the received signal contains audio information, then baseband system 560 decodes the signal and converts it to an analog signal. Then the signal is amplified and sent to a speaker. The baseband system 560 also receives analog audio signals from a microphone. These analog audio signals are converted to digital signals and encoded by the baseband system 560. The baseband system 560 also codes the digital signals for transmission and generates a baseband transmit audio signal that is routed to the modulator portion of the radio system 565. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 570 where the signal is switched to the antenna port for transmission.

The baseband system 560 is also communicatively coupled with the processor 510. The central processing unit 510 has access to data storage areas 515 and 520. The central processing unit 510 is preferably configured to execute instructions (i.e., computer programs or software) that can be stored in the memory 515 or the secondary memory 520. Computer programs can also be received from the baseband system 560 and stored in the data storage area 515 or in secondary memory 520, or executed upon receipt. Such computer programs, when executed, enable the system 500 to perform the various functions of the present invention as previously described. For example, data storage areas 515 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical and/or functional blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method to accelerate the transmission of packets by programmatically determining at least one next-hop mac address for packets to be transmitted in a network by an application residing at the application layer in a system having a kernel having a protocol stack, the method comprising:
   create a phantom datagram (UDP) having protocol headers;
   populate one or more of the protocol headers of the phantom UDP while leaving the next-hop MAC address header unpopulated;
   submit the phantom UDP to the kernel for traversing the protocol stack;
   receive the phantom UDP from the kernel with the next-hop MAC address header having been populated by the kernel;
   recognize the phantom UDP based upon one or more predetermined characteristics;
   store the next-hop MAC address header from the phantom UDP; and
   do not transmit the phantom UDP.

2. The method of claim 1 further comprising create a next UDP; retrieve the stored next-hop MAC address; and populate the header of the next UDP with the retrieved next-hop MAC address.

3. The method of claim 2 wherein the protocol stack of the kernel determines the next-hop MAC address header based on a predetermined set of rules that accounts for routing rules.

4. The method of claim 3 wherein the predetermined set of rules accounts for one or more of network-rules, security measures, firewall measures.

5. The method of claim 2 wherein the application has control over a NIC and further comprising instruct the NIC to drop the phantom UDP.

6. The method of claim 5 further comprising bypass the kernel and provide a next UDP to the NIC with the stored next-hop MAC address header populated in the next UDP.

7. The method of claim 2 further comprising
   use a bind call and a connect call with the kernel to create a socket;
   retrieve and store a source IP and source port from the phantom UDP which were populated by the kernel; and
   populate the header of the next UDP with the stored source IP and source port.

8. A method to programmatically determining at least one layer 2 destination address for packets to be transmitted in a network by an application residing at the application layer in a system having a kernel, the method comprising:
   creating a phantom packet;
   populating one or more of protocol headers of the phantom packet while leaving the layer 2 destination address unpopulated;
   submitting the phantom packet to the kernel;
   receiving the phantom packet from the kernel with the layer 2 destination address header having been populated by the kernel;
   recognizing the phantom packet;
   storing the layer 2 destination address from the phantom packet;
   creating a next packet; and
   populating header of the next packet with the stored layer 2 destination address.

9. The method of claim 8 wherein the kernel includes a protocol stack and the method further comprises the protocol stack of the kernel determines the layer 2 destination address based on a predetermined set of rules that accounts for routing rules.

10. The method of claim 9 wherein the predetermined set of rules accounts for one or more of network-rules, security measures, and firewall measures.

11. The method of claim 8 wherein the application has control over a network interface controller (NIC) and further comprising the NIC dropping the phantom packet.

12. The method of claim 11 further comprises bypassing the kernel and providing the next packet to the NIC.

13. The method of claim 8 further comprising
   use a bind call and a connect call with the kernel to create a socket;
   retrieve and store the source IP and source port from the phantom packet which were populated by the kernel; and
   populate the header of the next packet with the stored source IP and source port.

14. A system for accelerated transmission of packets over a network by programmatically determining a layer 2 destination address, the system comprising:
   at least one processor; and
   a memory in communication with the at least one processor and storing instructions that when executed by the at least one processor cause the at least on one processor to:
   execute an application residing at the application layer with an operating system having a kernel, the application operable to
   create a phantom packet,
   populate one or more of protocol headers of the phantom packet while leaving the layer 2 destination address unpopulated,
   submit the phantom packet to the kernel, receive the phantom packet from the kernel with the layer 2 destination address header having been populated by the kernel,
   recognize the phantom packet,
   store the layer 2 destination address from the phantom packet,
   create a next packet, and
   populate header of the next packet with the stored layer 2 destination address.

15. The system of claim 14 wherein the kernel includes a protocol stack and wherein the protocol stack of the kernel is configured to determine the layer 2 destination address based on a predetermined set of rules that accounts for routing rules.

16. The system of claim 15 wherein the predetermined set of rules accounts for one or more of network-rules, security measures, and firewall measures.

17. The system of claim 14 wherein the application is further operable to control a network interface controller and the network interface controller drops the phantom packet.

18. The system of claim 14 wherein the application is further operable to bypass the kernel and provide the next packet to the network interface controller.

19. The system of claim 14 wherein the application is further operable to
   use a bind call and a connect call with the kernel to create a socket;

retrieve and store the source IP and source port from the phantom packet which were populated by the kernel; and populate the header of the next packet with the stored source IP and source port.

20. The system of claim 14 wherein the application is further operable to populate the payload of the phantom UDP with an identifier and recognize the packet further includes recognizing the identifier.

* * * * *